United States Patent
Subramanyan et al.

(10) Patent No.: US 6,510,726 B1
(45) Date of Patent: Jan. 28, 2003

(54) BISMUTH TRACER BEARINGS

(75) Inventors: Palliyil K. Subramanyan, Solon, OH (US); Joseph J. Vauter, Middlefield, OH (US); Ronald W. Robinson, Zanesville, OH (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/469,444

(22) Filed: Dec. 21, 1999

Related U.S. Application Data

(60) Provisional application No. 60/113,775, filed on Dec. 23, 1998.

(51) Int. Cl.⁷ .............................................. G08B 21/00
(52) U.S. Cl. ............................................................ 73/7
(58) Field of Search .............................. 73/53.05, 53.07, 73/7

(56) References Cited

U.S. PATENT DOCUMENTS

| | | | |
|---|---|---|---|
| 3,753,695 A | 8/1973 | Lloyd | |
| 4,170,469 A | 10/1979 | Mori | |
| 4,309,064 A | 1/1982 | Fukuoka et al. | |
| 4,412,972 A | 11/1983 | Mori | |
| 4,551,395 A | 11/1985 | Lloyd | |
| 4,590,133 A | 5/1986 | Lloyd | |
| 4,620,185 A | * 10/1986 | Plahmer | 73/53.07 |
| 4,957,822 A | 9/1990 | Steeg et al. | |
| 5,045,405 A | 9/1991 | Koroschetz et al. | |
| 5,087,529 A | 2/1992 | Engel et al. | |
| 5,093,207 A | 3/1992 | Hodes et al. | |
| 5,122,208 A | 6/1992 | Alabi | |
| 5,137,792 A | 8/1992 | Hodes et al. | |
| 5,209,578 A | 5/1993 | Eastham et al. | |
| 5,286,445 A | 2/1994 | Kamiya | |

* cited by examiner

*Primary Examiner*—Robert Raevis
(74) *Attorney, Agent, or Firm*—Reising, Ethington, Barnes, Kisselle, Learman & McCulloch, P.C.

(57) ABSTRACT

A method of detecting premature wear of engine bearings in locomotive engine applications includes incorporating bismuth as a tracer element into the liner of bearing metal applied to a rigid metal backing of the bearing. A soft metal overlay free of bismuth is applied over the bearing liner and the bearing installed in the engine. The engine oil is periodically tested for the presence of bismuth. Early detection indicates premature wear of the overlay, enabling corrective action to be taken to protect the engine.

5 Claims, 1 Drawing Sheet

BISMUTH TRACER BEARINGS

Figure 1:
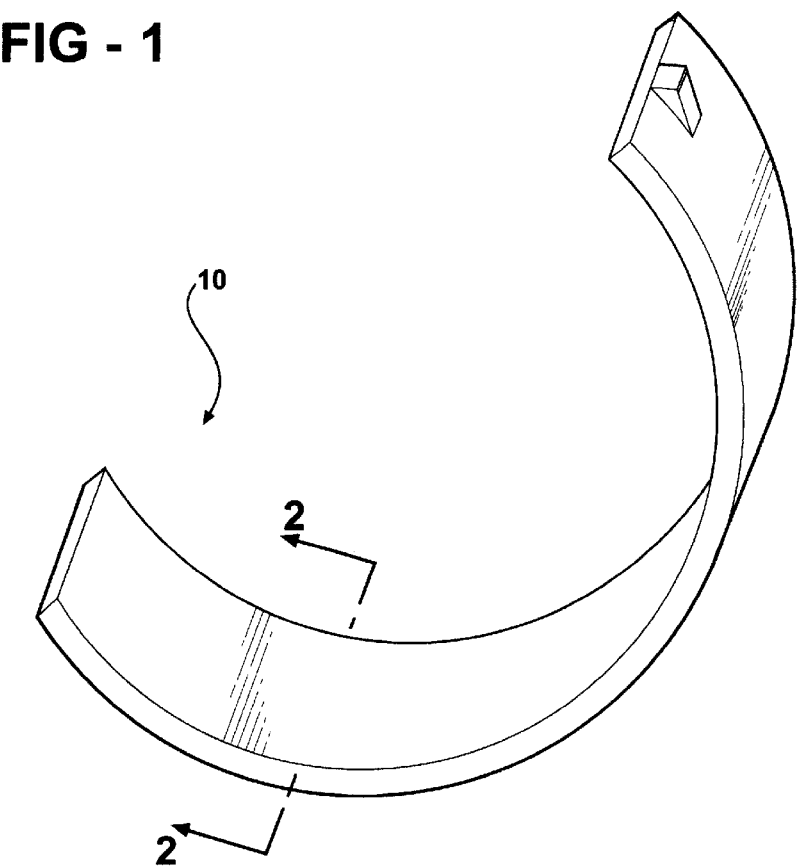

This application claims benefit of Provisional Application Serial No. 60/113,775 filed Dec. 23, 1998.

BACKGROUND OF THE INVENTION

1. Technical Field

This invention relates generally to bearings for locomotive engines, and more particularly to methods for detecting abnormal wear of locomotive engine bearings to permit corrective action to be taken. The disclosure incorporates bismuth tracer bearings disclosed in U.S. provisional patent application No. 60/113,775, filed Dec. 23, 1998, whose priority is claimed for this application.

2. Related Prior Art

Multi-layer plain engine bearings are used in locomotive engine applications to journal working components of the engine, such as the crankshaft. The bearings are made with a rigid metal backing on which a layer of functional copper-tin bearing metal is applied. The bearing layer is plated with a diffusion barrier layer of nickel and then plated with a softer overlay metal which serves as the running surface of the shaft. Under normal operating conditions, the overlay will survive for considerable time before the underlying bearing layer is exposed. However, should a bearing be improperly loaded due to, for example, misalignment between the shaft and engine block, there is the possibility of accelerated wear of the overlay, causing the bearing layer to become exposed too soon, and thus lessening the operating life of the bearing.

In one known attempt to monitor the wear characteristics of engine bearings in truck applications, a layer of silver was plated onto the nickel barrier layer of a sliding bearing, and the silver layer in turn covered by another layer of nickel, prior to plating the overlay. With such a bearing installed, the engine oil was periodically tested for the presence of silver. If silver was detected in the engine oil too soon (i.e., before the time in which the overlay would be expected to wear under normal operating conditions) then the conclusion was drawn that one or more bearings must be wearing prematurely, and the engine would be torn down to correct the problem in advance of damage to the engine.

However, in locomotive engine applications, the engine oil typically would be exposed to sources of silver apart from the silver tracer layer of such engine bearings. For example, the slipper bearings of the connecting rods of some engines contain silver which could leach into the engine oil and give a false indication of improper wear of the engine bearings. It is desirable, of course, to avoid the tremendous time and expense of tearing down a locomotive engine to replace the engine bearings and correct misalignments, etc., if such is not necessary.

Another drawback to the use of such a silver tracer layer is that it adds cost and complexity to the manufacture of locomotive engine bearings. Special requirements must be made for plating the silver and an added nickel layer is required to sandwich the silver between two layers of nickel. Environmental considerations must also be taken into account when plating silver. For these reasons, the use of a silver as a tracer material in locomotive engines is not satisfactory.

One of the objects of the present invention is to provide a method of detecting the wear characteristics of engine bearings for locomotive engine applications that minimizes or eliminates the foregoing disadvantages of silver.

SUMMARY OF THE INVENTION

According to the invention, a method is provided for detecting the wear characteristics of a multi-layer plain engine bearing in a locomotive engine having engine oil free of exposure to any sources of bismuth apart from the engine bearing. The method includes fabricating a rigid metal backing for the plain bearing and applying a functional bearing layer of copper-based bearing metal to the backing having bismuth incorporated therein. An overlay of a relatively softer metal is applied over the bearing layer and is free of bismuth. The bearing is installed in the locomotive engine and the engine oil is periodically tested for the presence of bismuth. If it is determined that bismuth is present in the engine oil too soon relative to the life expectancy of the overlay, then such would indicate premature wear of the overlay enabling corrective action to be taken to protect the engine.

Various locomotive engines have been analyzed and it was discovered that all were free of any source of bismuth, thus avoiding the problem of false positives associated with silver. Further, unlike silver, the bismuth can be incorporated into the traditional bearing metal alloys without having any detrimental effect on their properties, and perhaps enhancing their sliding properties.

THE DRAWINGS

Figure 2:
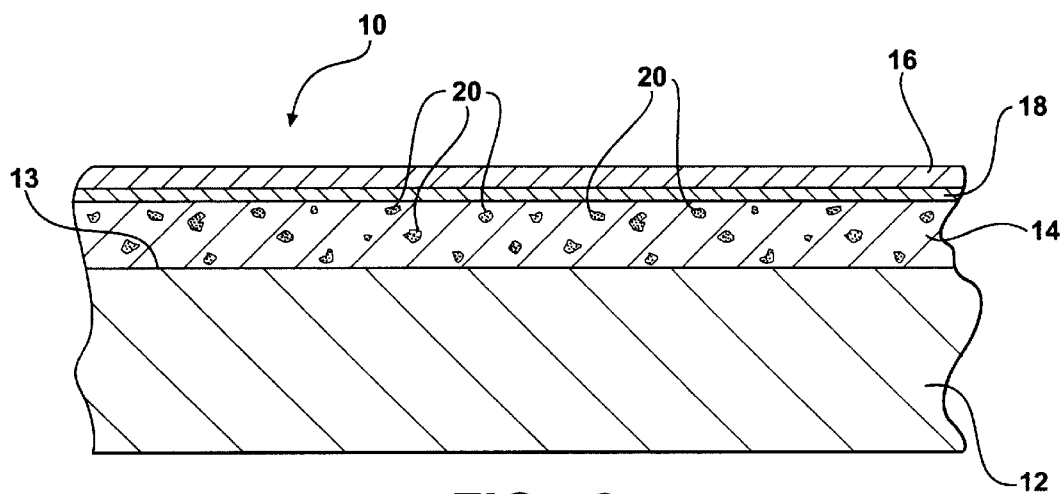

These and other features and advantages of the present invention will become more readily appreciated when considered in connection with the following detail description and appended drawings, wherein:

FIG. 1 is a perspective view of a multi-layer locomotive engine bearing according to the invention; and FIG. 2 is an enlarged, fragmentary cross-sectional view taken generally along lines 2—2 of FIG. 1.

DETAILED DESCRIPTION

FIG. 1 shows a typical multi-layer plain engine bearing 10 for a locomotive engine (not shown) which, as illustrated in FIG. 2, includes a generally semicircular metallic backing shell 12, a functional bearing layer or liner 14 applied to an inner concave surface 13 of the backing 12, and a thin overlay 16 applied to the functional layer 14.

The metal backing 12 may be fabricated of steel or other common materials according to conventional practice. The liner 14 may be the usual cast or sintered-type liners conventional to the art such as, for example, a sintered bronze copper-tin layer. The overlay 16 may comprise the usual soft electroplated layer of tin, or the like, plated onto the liner 14. Where a bronze liner 14 is employed, a nickel barrier layer 18 is plated onto the liner 14 before plating the overlay 16 according to conventional practice.

According to the invention, bismuth is incorporated into the liner 14 and is not present in the nickel 18 or overlay 16 layers. The bismuth 20 is illustrated diagrammatically in FIG. 2 as distinct phases present in a matrix of the liner material 14 and serves as a tracer element, as will be explained below, to detect unusual wear of the bearing 10.

It is beneficial to detect abnormally high wear rates of the liner 14 as soon as possible, since such detection may help avoid costly bearing failure and damage to an engine. In the past, silver has been used as a tracer element in engine bearings. A layer of silver is plated over the nickel barrier layer covering the liner, and an additional nickel layer is applied to the silver layer as a substrate for the overlay. By analyzing the lubricating oil to which the bearing is exposed, it is possible to detect through spectography the presence of silver, which would indicate that the bearing has worn through the overlay 16 and into the bearing layer 14.

Silver tracer bearings, however, cannot serve as tracer bearings in some applications such as locomotive engine applications, since there are often other sources of silver that are exposed to the engine oil, such as silver slipper bearings. There are also environmental considerations to be dealt with in plating the silver, namely the use of silver cyanide and potassium-cyanide solutions in the plating process. The requirement for an additional nickel barrier layer also adds to the cost and complexity of producing such engine bearings. Accordingly, there is not known to be a tracer bearing suitable for locomotive engine applications employing a tracer element not found in any material or components exposed to the engine oil that could contribute as a source of any detection of such tracer element.

The inclusion of bismuth into the liner 14 provides such a solution. Bismuth is not present in any of the engine components of a locomotive engine that the lubricating oil comes in contact with, nor is it present in any of the usual oil additives. In this respect, bismuth as a tracer element is unique. Detecting bismuth in the oil conclusively establishes wear of the liner layer 14. There is no uncertainty with respect to the source of bismuth. If bismuth is prematurely detected in the oil (i.e., prior to the typical wear life of the bearing where the liner 14 would begin to wear), it indicates a problem with the engine and corrective action can be taken before major problems develop with the engine.

Substantial amounts of bismuth can be added to the copper-tin liner 14 so that detection of bismuth can be made before too much wear or damage occurs in the bearings, and without the presence of the bismuth impairing the bearing properties of the liner 14. In fact, bismuth, which is a soft, low melting point material, has excellent bearing properties and may contribute to the bearing properties of the liner 14.

Unlike silver, bismuth can be incorporated into the liner material 14 and when sintered or cast onto the backing 12, the bismuth present itself as distinct phases 20 within a matrix of the liner material 14, illustrated diagrammatically in FIG. 2. The bismuth is present in the amount of about 5 to 25 wt % of the liner mates of lead containing bismuth may also be used in lieu of just bismuth. A lead alloy containing about 3±0.2 wt % by weight bismuth would be suitable as such would avoid formation of an undesirable low melting point eutectic phase of Pb—Sb. The lead in such case would be present in the amount of about 25 wt % of the liner material. The liner 14 preferably has a thickness of about 250 to 1,250 µm.

According to a method of the invention, a tracer bearing for locomotive engine applications is fabricated by securing a metallic functional layer 14 by either casting or sintering onto the backing end having incorporated into the matrix of the liner material 14 tracer phases 20 containing at least bismuth, and applying a overlay to the bearing liner, with all layers except the functional layer 14 being free of bismuth. The tracer phases 20 may comprise bismuth or an alloy thereof, such as lead-bismuth.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of detecting the wear characteristics of the bearing metal layer of a multi-layer plain engine bearing in a locomotive engine having engine oil free of exposure to any sources of bismuth apart from the engine bearing, said method comprising:

forming a rigid metal backing of the plain bearing;

applying a functional bearing layer of copper-tin-lead-bismuth alloy bearing metal to the backing;

applying a nickel layer to the bearing layer and applying a tin-containing overlay to the nickel barrier layer; and installing the bearing in the locomotive engine and periodically sampling and testing the engine oil for the presence of bismuth, whereby the early detection of bismuth in the engine oil would indicate premature wear through of the overlay and nickel barrier layer enabling corrective action to be taken to protect the engine.

2. The method of claim 1 wherein the bismuth is present in the amount of between 5 to 25 wt % of the bearing metal.

3. The method of claim 1 wherein the bismuth alloys with the lead forming lead-bismuth inclusions in the copper-tin matrix.

4. The method of claim 3 wherein the bismuth is present in an amount of about 30±0.2 wt % of the lead, and the lead is present in an amount of about 25 wt % of the bearing metal.

5. The method of claim 1 wherein the bearing layer is applied at a thickness of about 250 to 1,250 µm.

* * * * *